United States Patent [19]

Shatto, Jr. et al.

[11] Patent Number: 4,706,119
[45] Date of Patent: Nov. 10, 1987

[54] CAMERA VISION AXIS INCLINATION INDICATION APPARATUS

[75] Inventors: Howard L. Shatto, Jr., Houston, Tex.; George A. Smith, Jefferson, La.

[73] Assignee: Shell Offshore Inc., Houston, Tex.

[21] Appl. No.: 774,788

[22] Filed: Sep. 11, 1985

[51] Int. Cl.$^4$ .................... H04N 7/18; H04N 5/262
[52] U.S. Cl. .................... 358/99; 358/126; 358/103
[58] Field of Search ............ 358/99, 103, 125, 126; 273/DIG. 28

[56] References Cited

U.S. PATENT DOCUMENTS

| | | | |
|---|---|---|---|
| 2,433,971 | 1/1948 | Adams | 178/6.8 |
| 2,963,543 | 12/1960 | Link et al. | 178/6.8 |
| 3,099,316 | 7/1963 | Johnson | 166/46 |
| 3,258,595 | 6/1966 | Galante | 250/199 |
| 3,448,271 | 6/1969 | Aldrich et al. | 358/125 |
| 3,745,244 | 7/1973 | Jonsson | 358/126 |
| 3,780,220 | 12/1973 | Fugitt et al. | 178/6.8 |
| 4,490,742 | 12/1984 | Wurtzinger | 358/183 |
| 4,502,407 | 3/1985 | Stevens | 358/99 |

Primary Examiner—Howard W. Britton
Assistant Examiner—John K. Peng

[57] ABSTRACT

Operators of submerged remotely operated vehicles (R.O.V.)'s must typically view the subsea environment by use of a submerged television camera carried by the R.O.V. Often no part of the vehicle is visible to the operator to give him a natural indication of the direction in which the camera is facing with respect to the vehicle. The apparatus of the present invention generates an artificial "crosshair" on his television viewing screen representing a selected reference axis of the vehicle. This not only reduces directional disorientation of the operator but also gives him a line of sight, independent of camera direction, which he can use to establish the azimuth of subsea features with respect to the vehicle's compass.

1 Claim, 2 Drawing Figures

CAMERA VISION AXIS INCLINATION INDICATION APPARATUS

BACKGROUND OF THE INVETNION

The present invention relates to an apparatus used to inform the operator of a submerged remotely operated vehicle (hereinafter R.O.V.) of the amount of inclination of a camera's vision axis from a reference axis defined relative to the R.O.V. that carries the camera.

DESCRIPTION OF THE PRIOR ART

Methods and apparatus have been developed for drilling and completing oil and gas wells in the ocean floor in a manner such that after completion of the well the wellhead assembly including its various components is positioned beneath the surface of the water, preferably on the ocean floor. These facilities are often positioned in water depths greater than the depth at which a diver can safely and readily work. It may therefore be seen that the adjustment of any of the wellhead components from time to time, or the re-entry into a well to carry out maintenance or reconditioning work, presents a considerable problem when the wellhead assembly is positioned below the surface of the water.

As disclosed in U.S. Pat. No. 3,099,316 issued July 30, 1963 to Glenn D. Johnson a remotely operated vehicle (R.O.V.) may be used in place of a diver to perform the above mentioned well operation and maintenance tasks. The R.O.V. disclosed in this patent '316 is mounted on a track that encircles the well. Television cameras and floodlights are carried by the R.O.V. and are remotely-controlled by an operator positioned, say, at the surface on an operating barge, the video signals from the television camera being transmitted to the barge through cable. The camera may pan and tilt in different directions as the R.O.V. tracks around the wellhead.

In recent years, however, more sophisticated R.O.V.'s have been developed that can freely swim through the water and hover at selected positions away from the wellhead. The operator, however, of these more sophisticated devices sometimes experiences disorientation due to the change of his visual references as the camera is swiveled from a straight ahead direction. For example, if the camera is panned to the left 90° for several minutes as the R.O.V. hovers in front of the wellhead the operator may begin to assume that actuation of the R.O.V.'s thrusters will cause the R.O.V. to be driven left 90°. Unfortunately, actuation of the R.O.V.'s thrusters will drive the R.O.V. into the wellhead.

Since each R.O.V. may cost approximately $200,000 to $700,000, the cost of damage to the R.O.V. may be quite expensive. Well operations may also be curtailed until the R.O.V. can be repaired, not to mention the possibility of the R.O.V. damaging the wellhead.

A method and apparatus needs to be developed therefore that eliminates or reduces R.O.V. operator disorientation, and thereby reduces the possibility of collision damage to the R.O.V. and/or the associated wellhead equipment that the R.O.V. is attempting to repair.

SUMMARY OF THE INVENTION

The present invention consists of presenting an indication to the R.O.V. operator of the amount of inclination of the R.O.V. camera's vision axis from a reference axis defined relative to the R.O.V., the vision axis being the "line of sight" of the lens of the camera.

When the vision axis of the camera is aligned with a desired R.O.V. reference axis and therefore there is no inclination between the axes, a moveable indicator such as a crosshair will be viewed in the center of the operator's television screen. If the reference axis happens to be aligned with the forward direction of motion of the R.O.V., a crosshair centered in the middle of the television viewing screen will inform the operator that the R.O.V. will travel towards the object(s) viewed by the camera when the R.O.V.'s thrusters are actuated in that forward direction.

If the camera and therefore its vision axis is turned to the left, the crosshair which represents the location of the reference axis will correspondingly move to the right on the television viewing screen. In other words, since the center of the camera's vision axis will always appear in the center of the television screen, the crosshair or "moveable indicator" will move away from the center of the television screen whenever there is any amount of inclination between the vision axis and the reference axis. The amount of distance that the crosshair moves away from the center of the television screen indicates the relative amount of inclination that exists between the reference and vision axes.

To insure that the crosshair is maintained over the location of the reference axis as long as the reference axis remains within the television view, scaling factors may be incorporated into the moveable indicator signal generation equipment, the apparatus of the present invention, in order to adjust for variations in camera lens focal lengths which define the outer limits of the field of view of the television screen. Depending on the camera viewing angle and the range of the pan and tilt mechanisms, the operator may be able to turn the camera so that the reference axis indicator falls outside the viewing screen. In this case, limiting values may be placed in the software to cause the crosshair to remain with the edge of the screen and to blink and thereby indicate to the operator which direction the camera must be moved to bring it back into view. Additionally or as an alternative, secondary reference indicators at say 90° from the reference axis may be used with appropriate identifying symbols to advise the operator of current camera orientation.

The apparatus of the present invention is also useful for sighting and alignment for directional surveys where it is desired to establish the direction of heading or azimuth of a wellhead or flowline using a compass mounted on the R.O.V. Here typically the compass is aligned with a principal axis of the vehicle and the television screen presents both a digital and an analog display of the compass reading which is the heading or azimuth of the vehicle.

The crosshair of the present invention by pointing in the direction of the vehicle (and compass) provides a "sight" like a gunsight which permits the operator to align the vehicle and compass along for example a flowline to obtain the heading of the flowline even though the camera may have its center of view not aligned with that of the vehicle.

The R.O.V. cameras are situated normally so that their view is largely unobstructed and they therefore present no view of the R.O.V. itself which if available could give the operator a visual reference with respect to the R.O.V. in order to know at all times which way the camera is pointing with respect to the R.O.V.

Existing television monitors already may present camera pan and tilt angles in degrees. But it is very difficult for the operator to relate those numbers to the current direction in which the camera is pointed.

It is an object of this invention therefore to provide the operator with a natural and intelligible artificial visual indication of the direction of a reference axis of the vehicle so he will know more intuitively which way the camera's vision axis is pointing with respect to the vehicle. It is well recognized that this could be accomplished by mounting an array of mechanical reference markers or crosshairs on the vehicle out in front of the cameras, but these would be in the way when moving the R.O.V. up to a work area and would be subject to damage and would also be in the way of the manipulator arms when they are working.

It is an object of the invention to provide the operator of a R.O.V. that carries a camera with a visual indication of the inclination of the camera to a reference axis that is defined relative to the R.O.V.

It is an object of the invention to minimize the risk of collisions between an R.O.V. and an adjacent wellhead.

It is a feature of the invention to provide an indicator to the R.O.V. operator that indicates the amount of inclination of the camera's vision axis from the reference axis, the reference axis being defined relative to the R.O.V.

It is a further feature of the invention to provide a moveable indicator on the operator's television screen that indicates this amount of inclination.

These and other features, objects, and advantages of the present invention will become apparent from the following detailed description, wherein reference is made to the figures in the accompanying drawings.

DESCRIPTION OF THE PREFERRED EMBODIMENT

Figure 1:
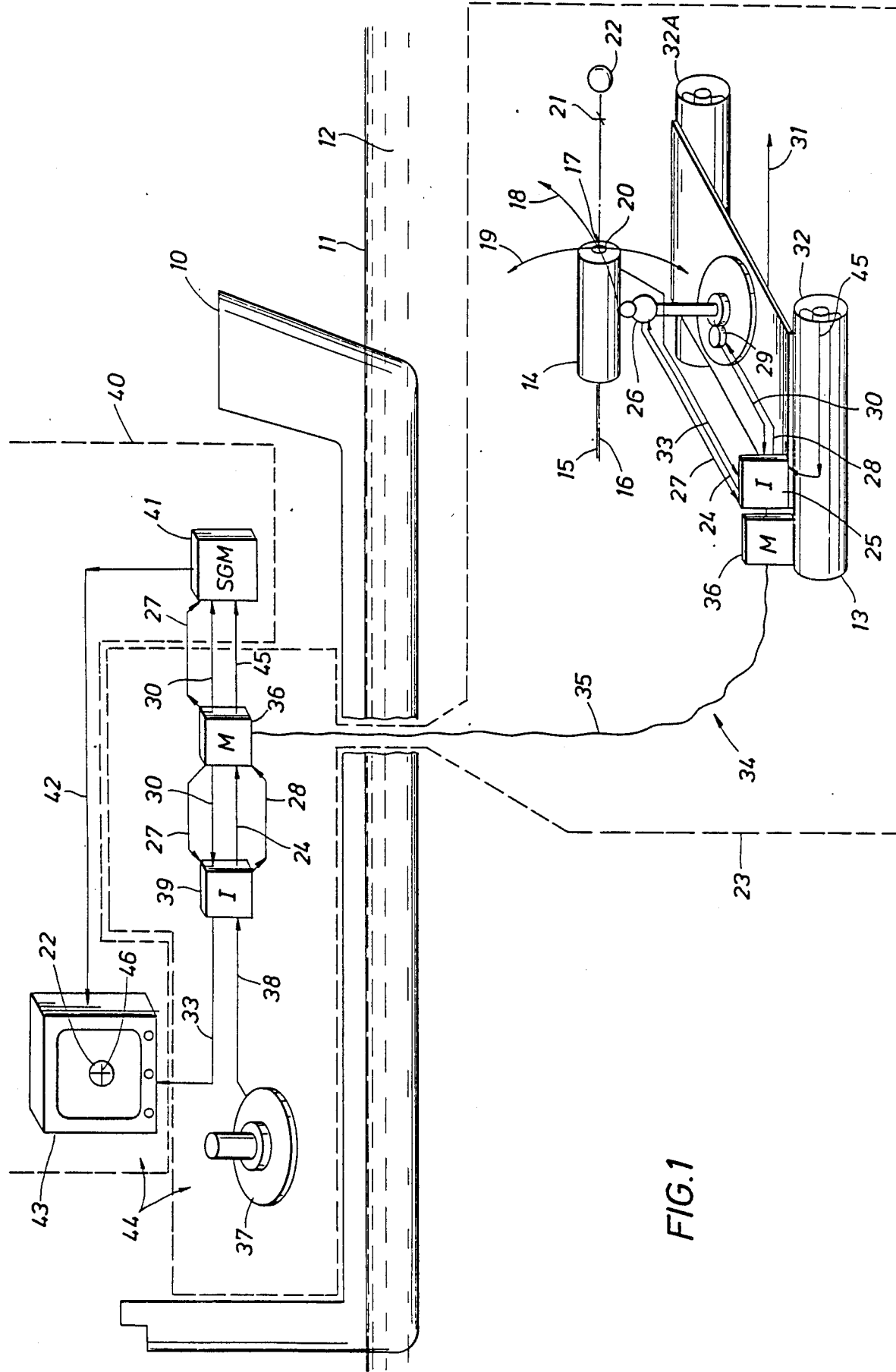
FIG. 1 is a schematic representation showing a R.O.V. submerged in a body of water beneath a floating vessel.
Figure 2:
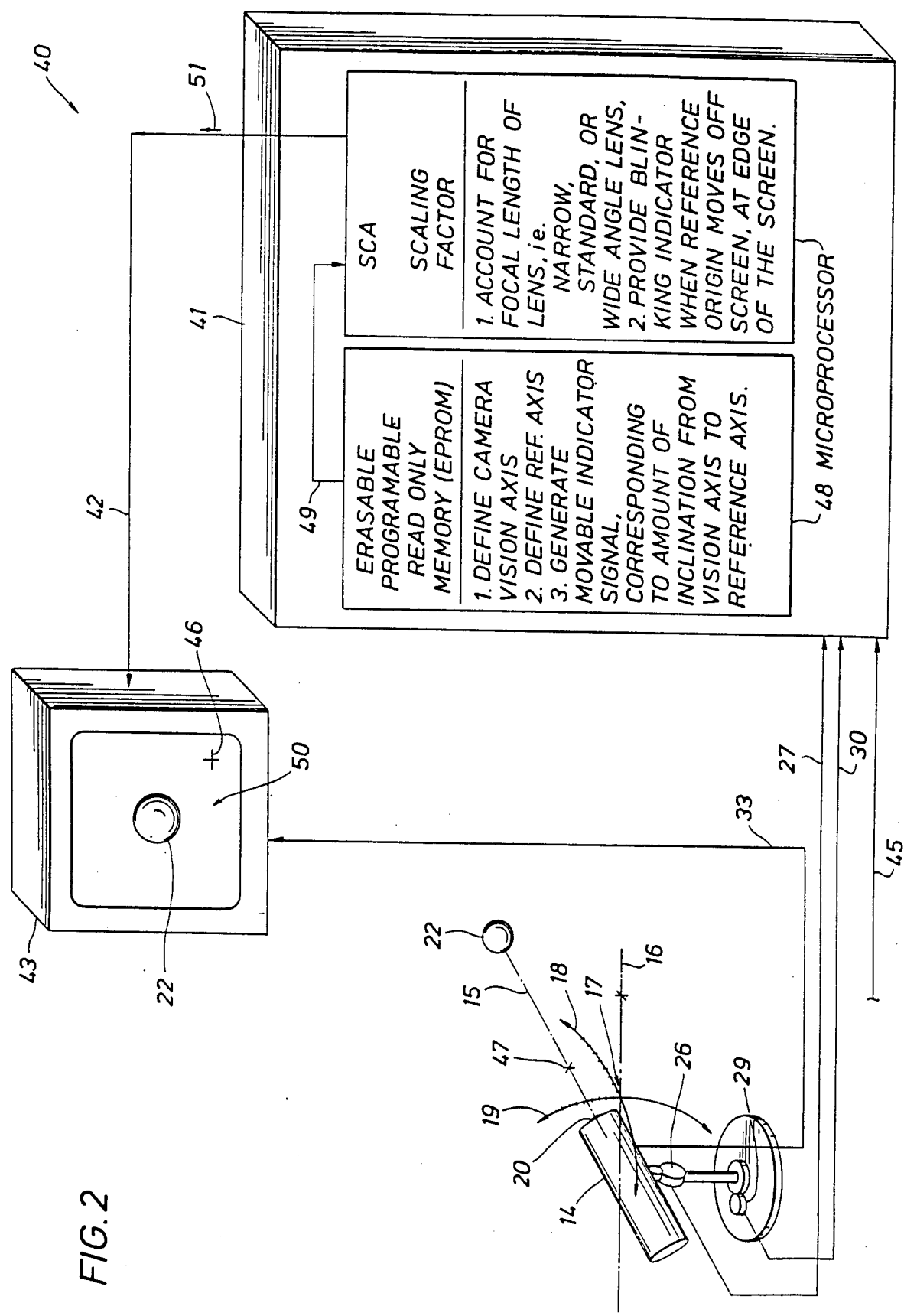
FIG. 2 is a schematic representation showing the camera viewing an object oriented away from the camera's reference axis, and the associated presentation of the object and a moveable indicator on the moveable indicator display means.

Referring now to FIG. 1 a vessel 10 is shown floating upon the surface 11 of a body of water 12. A remotely operated vehicle (hereinafter R.O.V.) 13 is shown submerged in the body of water 12. A camera 14 is shown operatively engaged to the R.O.V. 13. Vision axis 15 is shown aligned with reference axis 16, both axes 15, 16 passing through the origin 17 of the mutually orthogonal pan axis 18 and tilt axis 19. The camera 14 carries viewing means 20, such as a lens well known to the art, the viewing means 20 being shown positioned at the origin 17 of the tilt and pan axes 18, 19. Note that for the sake of clarity the pan and tilt axes 18, 19 are defined with respect to the central point of movement of the viewing means 20 and not with respect to the central point of movement of the camera 14. The camera vision axis 15 and reference axis 16 are shown passing through the viewing means 20, origin 17, a reference indicator 21, and a viewed object 22 such as a submerged sphere. The camera vision axis 15 is defined through the viewing means 20 and objects located centrally in front of and viewed by the viewing means 20. In FIGS. 1 and 2 the camera's 14 vision axis 15 is shown aligned with the camera's longitudinal axis. As discussed later, it should be recognized that the vision axis 15 need not be aligned with the camera's longitudinal axis (not shown for clarity).

Forming a portion of the camera position control and position measurement apparatus 23 an interface 25 well known to the art is shown producing a tilt actuation signal 24 which is subsequently received by a tilt actuator 26 operatively engaged to the camera 14. Actuation of the tilt actuator 26 causes the viewing means 20 of the camera 14 to move with respect to tilt axis 19. The inclination of the viewing means 20 relative to the tilt axis will be indicated by the value of a tilt inclination signal 27 generated by the tilt actuator 26, by means well known to the art. It is well recognized that other means of actuation and measurement of the resultant inclination of the viewing means 20 of the camera 14 may be used.

In a similar manner a pan actuation signal 28 is produced by interface 25 and causes the actuation of pan actuator 29. A pan inclination signal 30 generated by pan actuator 29 indicates the position of the viewing means 20 of the camera 14 with respect to the pan axis 18 by means well known to the art. In a preferred embodiment the tilt and pan actuators 26, 29 respectively form camera inclination signal means by producing or generating the tilt and pan inclination signals 27, 30 respectively, though it is well recognized that other devices may be used to generate these signals 27, 30.

It is well recognized that in a typical installation the origin 17 of the pan and tilt axis 18, 19 may be chosen to be located at the central point of movement of the camera 14, instead of at the central point of movement of the viewing means 20. The axes 18, 19 may be located at the central point of movement of camera 14 as long as the vision axis 15 of the viewing means 20 coincides with the central longitudinal axis of the camera 14. But vision axis 15 inclination measurement problems will result if the viewing means 20 (or lens) is oriented at any angle that does not coincide with the central longitudinal axis of the camera 14. For example, if the viewing means 20 is installed in the camera 14 at a 15° angle offset from the longitudinal axis of the camera 14, the vision axis 15 inclination signals if generated from reference to the camera's 14 longitudinal axis would be in error by 15°.

To precisely define, therefore, the true inclination of the vision axis 15 relative to the reference axis 16, and for purposes of clarity the origin 17 of the pan and tilt axis 18, 19 is shown located at the central point of movement of the viewing means 20.

It is well recognized that the value of the tilt and pan inclination signals 27 and 30 respectively may be adjusted or modified if the camera's 14 vision axis 15 does not coincide with the central longitudinal axis of the camera 14.

The direction of the preferred motion of R.O.V. 13 is shown by arrow 31. The direction may be maintained by operation of thrusters 32, 32A located on the R.O.V. 13. A video signal 33 is shown produced by camera 14 and received by interface 25.

Signal transmission means 34 such as a multiplex cable 35 well known to the art coupled at either end to multiplex devices 36 also well known to the art transmits signals 24, 27, 28, 30, 33 to and from the floating vessel 10 and the R.O.V. 13.

Referring in more detail now to the equipment located on the vessel 10, in a preferred embodiment a camera position controller 37 such as a joy stick well known to the art produces a position demand signal 38 to interface 39. The interface 39 compares the demand signal 38 with the existing tilt and pan inclination signals 27, 30, respectively. If necessary the interface 39 will continue to generate tilt and/or pan actuation signals 24, 28 which will cause the continued movement of the viewing means 20 until the conditions of the position demand signal 38 are satisfied, by means and methods common to feedback control systems well known to the art. It is well recognized that the camera position controller 37 position demand signal 38 may be used to indicate the position of the camera 14, such that, in an alternative embodiment, the position demand signals 38 may be used in place of the signals 27, 30 from the camera inclination signal means.

The camera vision axis inclination indication apparatus 40, the object of the present invention, comprises a moveable indicator signal generation means 41 that includes a micro-processor 48 well known to the art that may incorporate for example appropriate analog to digital conversion equipment (not shown) to process input and output signals as necessary, a moveable indicator signal transmission means 42 such as an electrical conduit well known to the art, and a moveable indicator display means 43 such as a cathode ray tube having a television screen well known to the art. Video signal 33 produced by camera 14 is input into the display means 43 and subsequently presents a view of objects located in the field of view of camera vision axis 15 to the R.O.V. 13 operator, by means well known to the art. Notice that display means 43 and the camera position controller 37 both form portions of an operator's console 44 used by the operator of the R.O.V. 13.

Signal generation means 41 receive the tilt and pan inclination signals 27, 30 respectively from the multiplex 36. Signal generation means 41 may also receive a thruster selection signal 45. As explained later, computations carried out by the signal generation means 41 on the basis of signals 27, 30, (45) will cause a moveable indicator 46 to be properly located and presented on the moveable indicator display means 43, as a representation to the operator of the amount of inclination from the reference axis 16 to the camera's 14 vision axis 15, or, from another perspective, the amount of inclination from the vision axis 15 to the reference axis 16, both amounts of inclination having the same value.

Referring now to FIG. 2, the viewing means 20 of camera 14 for purpose of illustration is shown to have a 30° pan and 40° tilt inclination 47, in the process of viewing the viewed object 22. Object 22 has moved from its position shown in FIG. 1 and the camera's viewing means 20 has been moved to keep object 22 in the center of its vision. Tilt and pan inclination signals 27, 30 respectively, generated by the tilt and pan actuators 26, 29 respectively are shown being received by the moveable indicator signal generation means 41, while video signal 33 is shown being received by the display means 43.

A compilation of the functions performed by the microprocessor 48, such as a Leibnitz Lann Model 107LE Video Overlay Unit manufactured by Liebnitz Lann Ltd. Balmakeith Industrial Estate, Nairn, Scotland, Telex 75688, located within the signal generation means 41 is tabulated in FIG. 2 for further reference. The eraseable programmable read only memories of the microprocessor 48 are programmed to interpret signals 27, 30 and thereafter output the desired moveable indicator signals 51. An unscaled moveable indicator signal 49 is shown leaving the eraseable programmable read-only memory section of the microprocessor 48 prior to being received by the scaling factor portion of the microprocessor 48. A viewing area 50 is defined within the boundaries of the moveable indicator display means 43. The viewing area 50 forms the display portion of the cathode ray tube mentioned earlier.

The camera vision axis inclination indication apparatus 40 is used to determine the amount of inclination from the camera vision axis 15 to the reference axis 16. The vehicle 13 will carry camera inclination signal means in a preferred embodiment consisting of a tilt and pan actuator 26, 29 respectively, which are operatively engaged to the camera 14. The inclination signal means produce camera tilt and pan inclination signals 27, 30 which indicate the amount of inclination from the vision axis 15 to the vehicle 13. The inclination signals 27, 30 are transmittable from the inclination signal means 26, 29 by use of signal transmission means 34 which comprise in a preferred embodiment the multiplex cable 35 which is used in conjunction with the multiplex devices 36 well known to the art.

The microprocessor 48 of the signal generation means 41 defines the location of the camera's vision axis 15 by means well known to the art. The microprocessor 48 also defines the location of reference axis 16 relative to the vehicle 13.

For example, in a preferred embodiment the reference axis 16 may be defined parallel to the longitudinal axis of the vehicle 13 or parallel to the direction 31 of preferred motion of the vehicle 13. Once both axes 15, 16 are defined by the microprocessor 48 the amount of inclination from the vision axis 15 to the reference axis 16 may be easily calculated.

The moveable indicator display means 43 is capable of receiving the moveable indicator signal 51 generated by the signal generation means 41 and thereafter displaying the moveable indicator 46 upon the viewing area 50 of the display means 43. Moveable indicator signal transmission means 42 are capable of receiving the moveable indicator signal 51 from the signal generation means 41 and producing the signal 51 to the moveable indicator display means 43 by means well known to the art.

As can be seen in FIG. 2 the camera's 14 vision axis 15 has been moved away from an orientation parallel to the reference axis 16 in order to view the object 22. The display means 43 presents the object 22 in the center of the viewing area 50. The moveable indicator 46 is presented in the lower right hand corner of the viewing area 50, however, because it indicates the location of reference axis 16. Since the reference axis 16 in a preferred embodiment may be selectively aligned with the direction 31 of preferred motion of the R.O.V. 13, the operator needs only note the location of the moveable indicator 46 in order to know where the R.O.V. 13 will be directed upon actuation of thrusters 32, 32A. If the reference axis 16 has been aligned in this direction 31 the R.O.V. 13 will tend to drive forward in a direction to the lower right of the viewed object 22 when thrusters 32, 32A are actuated. It is understood, of course, that the reference axis 16 may remain aligned with, for example, the longitudinal axis of the R.O.V. 13, or perhaps even oriented to a particular compass heading, dependent upon the choice of the operator of the R.O.V.

Referring to FIG. 1 it can be seen that the vision axis 15 is lined up directly with the reference axis 16 and viewed object 22. As shown on the moveable indicator display means 43 in FIG. 1 the moveable indicator 46 is positioned over the viewed object 22. In this example since the moveable indicator 46 is centered directly over the viewed object 22 if the direction of thrust of the thrusters 32, 32A is aligned with the reference axis 16 and the thrusters 32, 32A are subsequently energized then the camera 14 will eventually collide with the viewed object 22.

In a preferred embodiment of the present invention the reference axis 16 remains in a fixed orientation relative to the remotely operated vehicle 13. In other words, the reference axis 16 in a first mode of operation may always remain parallel to the longitudinal axis of the remotely operated vehicle 13. If this is the case, the operator of the R.O.V. 13 will become accustomed to a set reference axis 16 regardless of the possible changes in the direction 31 of the R.0.V's due to changes in the actuation pattern of thrusters 32, 32A.

It is well recognized, however, that the operator in a second mode of operation may desire to have the signal generation means 41 redefine the reference axis 16 every time that a new direction 31 of preferred motion results from a different actuation pattern of thrusters 32, 32A. The microprocessor 48 may be programmed by means well known to the art to operate in either the first or second mode of operation. The second mode of operation where the reference axis 16 is reoriented every time a different thruster 32, 32A pattern is used may be affected by the microprocessor 48 by inclusion of the thruster 32, 32A selection signal 45 into the signal generation means 41. The thruster selection signal 45 would include the number and direction of thrusters 32, 32A that are to be actuated or that are currently actuated in order to allow the signal generation means 41 to properly calculate the heading of the R.O.V. under operation or anticipated operation of each particular combination of thrusters 32, 32A.

It is well recognized that whereas only two thrusters 32, 32A are shown in FIG. 1, additional thrusters (not shown) are typically incorporated into the R.O.V. 13 in order to allow it to move freely in three dimensions.

Referring more specifically to FIGS. 1 and 2 it can be seen that in a preferred embodiment, the camera vision axis inclination indication apparatus 40 is carried by and used on a first vehicle comprising the floating vessel 10. The first vehicle is tethered to a second vehicle comprising the remotely operated vehicle 13. It is well understood, however, that the inclination indication apparatus 40 may be directly mounted on the vehicle 13 that also carries the camera 14.

In order for the moveable indicator 46 to represent correctly the position of the reference axis 16 on the viewing area 50, a scaling factor must be applied to the unscaled movable indicator signal 49 to accommodate the particular focal length chosen for the viewing means 20 of camera 14. This factor will be fixed for any fixed focal length lens such as a narrow, standard or wide angle lens. In the event a variable focal length or zoom lens is used, its control or feedback signal must be input to the movable indicator signal generation means 41 to adjust the scaling factor to accommodate the focal length in use at any time by the operator.

The sweep angles of the pan and tilt actuators 29 and 26 respectively are likely to exceed the viewing angles subtended by even a wide angle lens, and this would tend at times to make the movable indicator 46 "fall outside" of the viewing area 50. In this event the movable indicator signals 51 should be limited by the microprocessor 48 program to values just less than the outside limits of the viewing angles of the viewing means 20 of camera 14, and when these limits are reached, the movable indicator 46 should be caused to blink, or otherwise the representation of the moveable indicator 46 may be changed in some recognizable manner. This will indicate to the operator that the reference axis 16 as represented by the moveable indicator 46 is outside the view of the vision means 20 (lens) of the camera 14. This will also indicate to the operator the direction in which the lens 20 of the camera 14 must be moved to bring the moveable indicator 46 back into the viewing area 50.

In a preferred embodiment the movable indicator 46 is shown as taking the form of a crosshair symbol well known to the art. It is well recognized however that many graphical presentations may be made to accomplish the same result.

Many other variations and modifications may be made in the apparatus and techniques hereinbefore described, both by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

I claim as my invention:

1. Camera vision axis inclination indication apparatus for indicating the amount of inclination from a vision axis to a reference axis, said reference axis defined, parallel to a preferred direction of motion of a vehicle, said direction determined upon actuation of selected thrusters operatively engaged to said vehicle, said thrusters producing thruster selection signals, said vision axis defined through viewing means carried by a camera and objects viewed by said viewing means located in front of said viewing means, said camera operatively engaged to said vehicle, said vehicle carrying camera inclination signals indicating the inclination of said vision axis relative to said vehicle, said inclination signals transmittable from said inclination signal means through signal transmission means, said camera vision axis inclination indication apparatus comprising;

a moveable indicator signal generation means capable of receiving said thruster selection signals and capable of receiving said camera inclination signals from said signal transmission means, thereafter defining the orientation of said vision axis relative to said vehicle, defining the orientation of said reference axis parrallel to a preferred direction of motion of said vehicle, calculating the amount of inclination from said vision axis to said reference axis, and transmitting a moveable indicatior signal representing the amount of inclination from said camera's vision axis to said reference axis, a moveable indicator display means having a viewing area capable of receiving said moveable indicator signal and displaying a moveable indicator on the viewing area, the distance of said moveable indicator from the center of the viewing area representing the amount of inclination from said vision axis to said reference axis, and moveable indicator signal transmission means capable of receiving said moveable indicator signal from said signal generation means and transmitting said signal to said moveable indicator display means.

* * * * *